US012696293B2

(12) United States Patent
Bai et al.

(10) Patent No.: US 12,696,293 B2
(45) Date of Patent: Jul. 28, 2026

(54) DOWNLINK CONTROL INFORMATION FORMAT FOR INDICATION OF TRANSMISSION CONFIGURATION INDICATION STATE

(71) Applicant: QUALCOMM Incorporated, San Diego, CA (US)

(72) Inventors: Tianyang Bai, Somerville, NJ (US); Yan Zhou, San Diego, CA (US); Fang Yuan, Beijing (CN); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/550,202

(22) PCT Filed: Jun. 11, 2021

(86) PCT No.: PCT/CN2021/099692
§ 371 (c)(1),
(2) Date: Sep. 12, 2023

(87) PCT Pub. No.: WO2022/236912
PCT Pub. Date: Nov. 17, 2022

(65) Prior Publication Data
US 2024/0155649 A1 May 9, 2024

(51) Int. Cl.
*H04W 72/232* (2023.01)
*H04L 1/00* (2006.01)
(Continued)

(52) U.S. Cl.
CPC ......... *H04W 72/232* (2023.01); *H04L 1/0004* (2013.01); *H04W 72/0446* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2020/0120644 A1* | 4/2020 | Zhou | .................... | H04B 7/0617 |
| 2023/0336284 A1* | 10/2023 | Gao | ..................... | H04L 1/1819 |
| 2024/0188098 A1* | 6/2024 | Matsumura | ........... | H04L 1/1896 |

FOREIGN PATENT DOCUMENTS

| | | |
|---|---|---|
| CN | 111937457 A | 11/2020 |
| WO | 2020222604 A1 | 11/2020 |

OTHER PUBLICATIONS

CATT: "Discussions on Enhancements on Multi-beam Operation", 3GPP TSG RAN WG1 #104b-e, R1-2102598, e-Meeting, Apr. 12, 2021-Apr. 20, 2021, 16 Pages, Apr. 20, 2021 (Apr. 20, 2021), section 2.2.

(Continued)

*Primary Examiner* — Walter J Divito
(74) *Attorney, Agent, or Firm* — ArentFox Schiff, LLP

(57) ABSTRACT

The present disclosure provides systems, devices, apparatus and methods, including computer programs encoded on storage media, for downlink control information format for indication of transmission configuration indication state. A user equipment may receive, from a base station, downlink control information (DCI); determining whether the DCI is used for beam indication with or without downlink assignment. The UE also may apply transmission configuration indication (TCI) states based on TCI codepoints in a TCI field of the DCI, when the DCI is used for beam indication. The base station may generate the DCI with information indicating whether the DCI is intended for beam indication with or without downlink assignment, in which the DCI includes the TCI codepoints to apply the TCI states at the UE when the information in the DCI indicates that the DCI is (Continued)

500

RECEIVE, FROM A BASE STATION, DOWNLINK CONTROL INFORMATION (DCI) — 502

DETERMINE THAT THE DCI IS USED FOR BEAM INDICATION WITH OR WITHOUT DOWNLINK ASSIGNMENT — 504

APPLY ONE OR MORE TRANSMISSION CONFIGURATION INDICATION (TCI) STATES BASED ON ONE OR MORE TCI CODEPOINTS IN A TCI FIELD OF THE DCI, WHEN THE DCI IS DETERMINED TO BE USED FOR BEAM INDICATION — 506 intended for beam indication. The base station may transmit, to the UE, the DCI.

41 Claims, 8 Drawing Sheets

(51) Int. Cl.
    *H04W 72/0446*     (2023.01)
    *H04W 76/20*     (2018.01)

(56)         References Cited

OTHER PUBLICATIONS

International Search Report and Written Opinion—PCT/CN2021/093081—ISA/EPO—Feb. 10, 2022.
International Search Report and Written Opinion—PCT/CN2021/099692—ISA/EPO—Feb. 10, 2022.
Mediatek Inc: "Enhancement on Multi-Beam Operation", 3GPP TSG RAN WG1 #104b-e, R1-2102675, e-Meeting, Apr. 12, 2021-Apr. 20, 2021, 2021, 35 Pages. Apr. 20, 2021 (Apr. 20, 2021), sections 2.1-2.3.

* cited by examiner

400

| | SPS/UL Type2 release | SPS/UL Type2 activation | Type3 HARQ request | Scell Dormancy |
|---|---|---|---|---|
| DCI format | UL: 0_0, 0_1, 0_2; DL: 1_0, 1_1, 1_2 | | 1_1 | 1_1 |
| RNTI | CS-RNTI | | C-RNTI, MCS-C-RNTI | |
| One-shot HARQ request | | | '1' | U/A or '0' |
| TDRA | All '0' or '1' | | All '0' or '1' | All '0' or '1' |
| MCS (of TB1) | All '1' | | | |
| NDI (of TB1) | '0' | '0' | | |
| RV (of TB1) | '0' | '0' | | |
| HARQ | | | | |
| Antenna port | | | | |
| DMRS sequence init. | | | | |

500
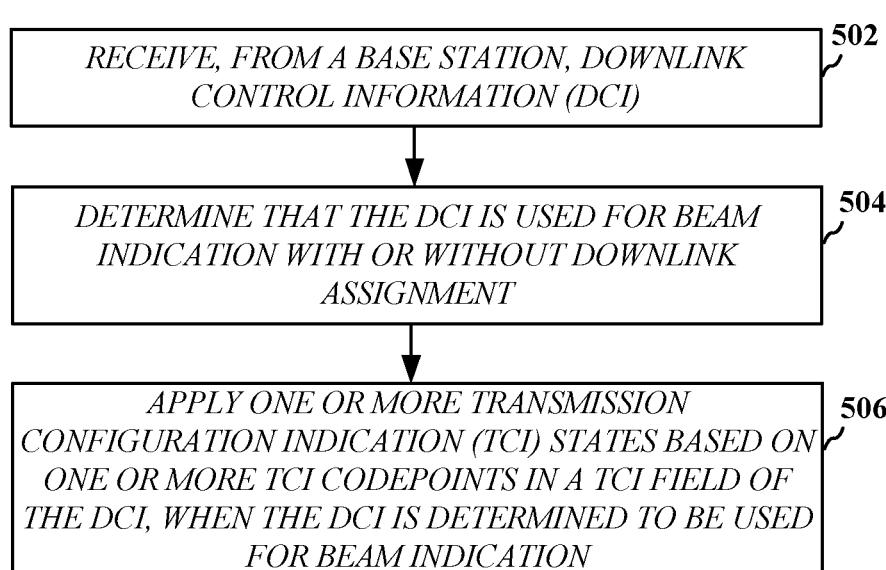
RECEIVE, FROM A BASE STATION, DOWNLINK CONTROL INFORMATION (DCI) — 502
DETERMINE THAT THE DCI IS USED FOR BEAM INDICATION WITH OR WITHOUT DOWNLINK ASSIGNMENT — 504
APPLY ONE OR MORE TRANSMISSION CONFIGURATION INDICATION (TCI) STATES BASED ON ONE OR MORE TCI CODEPOINTS IN A TCI FIELD OF THE DCI, WHEN THE DCI IS DETERMINED TO BE USED FOR BEAM INDICATION — 506
FIG. 5

600

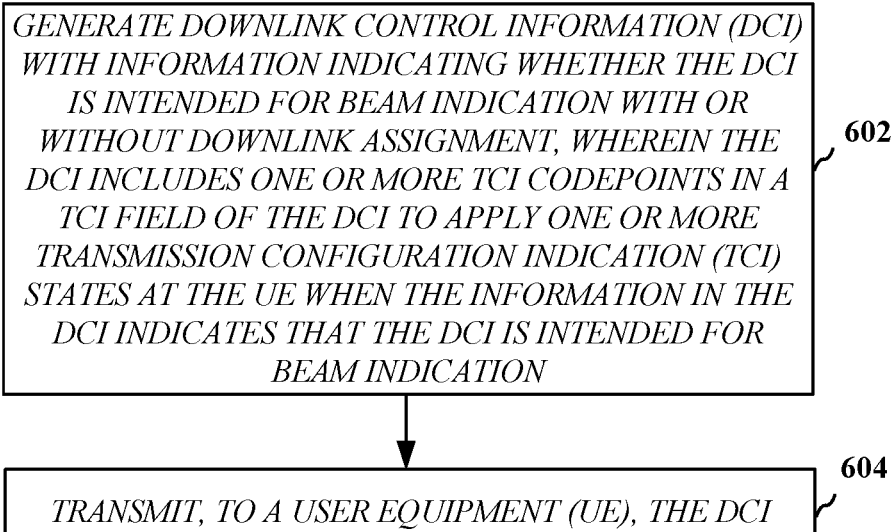

*GENERATE DOWNLINK CONTROL INFORMATION (DCI) WITH INFORMATION INDICATING WHETHER THE DCI IS INTENDED FOR BEAM INDICATION WITH OR WITHOUT DOWNLINK ASSIGNMENT, WHEREIN THE DCI INCLUDES ONE OR MORE TCI CODEPOINTS IN A TCI FIELD OF THE DCI TO APPLY ONE OR MORE TRANSMISSION CONFIGURATION INDICATION (TCI) STATES AT THE UE WHEN THE INFORMATION IN THE DCI INDICATES THAT THE DCI IS INTENDED FOR BEAM INDICATION*

602

*TRANSMIT, TO A USER EQUIPMENT (UE), THE DCI*

DOWNLINK CONTROL INFORMATION FORMAT FOR INDICATION OF TRANSMISSION CONFIGURATION INDICATION STATE

CROSS REFERENCE TO RELATED APPLICATION(S)

This application is a National Phase entry of PCT Application No. PCT/CN2021/099692, entitled "DOWNLINK CONTROL INFORMATION FORMAT FOR INDICA-TION OF TRANSMISSION CONFIGURATION INDICA-TION STATE" and filed on Jun. 11, 2021, which claims priority of PCT Application No. PCT/CN2021/093081, entitled "DOWNLINK CONTROL INFORMATION FOR-MAT FOR INDICATION OF TRANSMISSION CON-FIGURATION INDICATION STATE" and filed on May 11, 2021, both of which are expressly incorporated by reference herein in their entirety.

BACKGROUND

Technical Field

The present disclosure relates generally to communica-tion systems, and more particularly, to downlink control information format for indication of transmission configu-ration indication state.

INTRODUCTION

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division mul-tiple access (FDMA) systems, orthogonal frequency divi-sion multiple access (OFDMA) systems, single-carrier fre-quency division multiple access (SC-FDMA) systems, and time division synchronous code division multiple access (TD-SCDMA) systems.

These multiple access technologies have been adopted in various telecommunication standards to provide a common protocol that enables different wireless devices to commu-nicate on a municipal, national, regional, and even global level. An example telecommunication standard is 5G New Radio (NR). 5G NR is part of a continuous mobile broad-band evolution promulgated by Third Generation Partner-ship Project (3GPP) to meet new requirements associated with latency, reliability, security, scalability (e.g., with Inter-net of Things (IoT)), and other requirements. 5G NR includes services associated with enhanced mobile broad-band (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The appa-ratus may be a wireless device at a UE that includes a memory and at least one processor coupled to the memory. The memory may include instructions that, when executed by the at least one processor, cause the at least one processor to receive, from a base station, downlink control information (DCI); determine whether the DCI is used for beam indica-tion with or without downlink assignment; and apply one or more transmission configuration indication (TCI) states based on one or more TCI codepoints in a TCI field of the DCI, when the DCI is determined to be used for beam indication.

In another aspect of the disclosure, a method, a computer-readable medium, and an apparatus are provided. The appa-ratus may be a wireless device at a base station that includes a memory and at least one processor coupled to the memory. The memory may include instructions that, when executed by the at least one processor, cause the at least one processor to generate downlink control information (DCI) with infor-mation indicating whether the DCI is intended for beam indication with or without downlink assignment, wherein the DCI includes one or more TCI codepoints in a TCI field of the DCI to apply one or more transmission configuration indication (TCI) states at the UE when the information in the DCI indicates that the DCI is intended for beam indication; and transmit, to a user equipment (UE), the DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a flowchart of a process of wireless communi-cation of a UE that facilitates a downlink control informa-tion format for indication of transmission configuration indication state.

FIG. 6 is a flowchart of a process of wireless communi-cation of a base station that configures a downlink control information format for indication of transmission configu-ration indication state.

DETAILED DESCRIPTION

Figure 1:
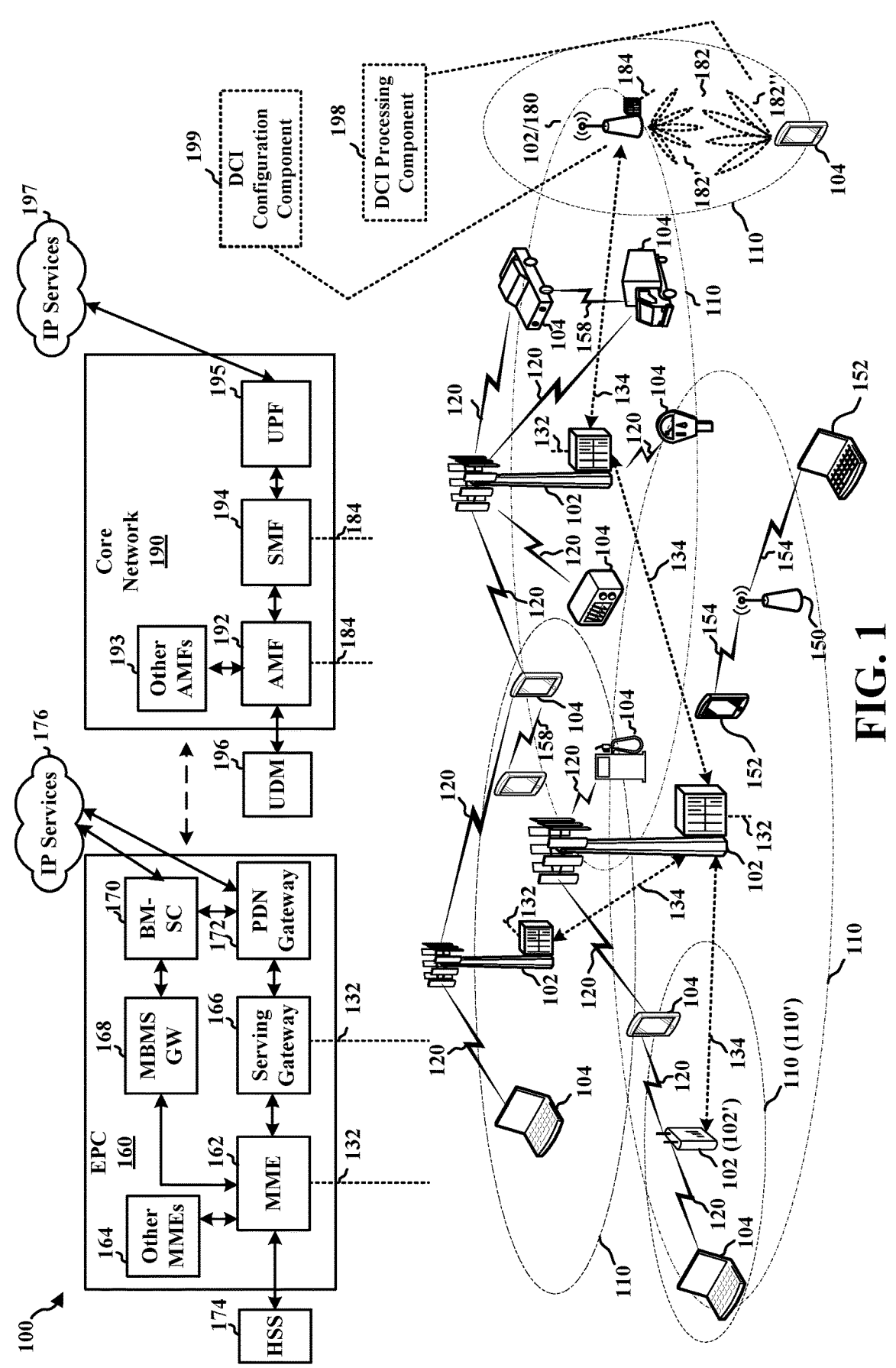
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, abasic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive, from a base station, downlink control information (DCI); determine whether the DCI is used for beam indication with or without downlink assignment; and apply one or more transmission configuration indication (TCI) states based on one or more TCI codepoints in a TCI field of the DCI, when the DCI is determined to be used for beam indication (e.g., DCI processing component 198). In other aspects, the BS 102/180 may be configured to generate downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at the UE when the information in the DCI indicates that the DCI is intended for beam indication; and transmitting, to a user equipment (UE), the DCI (e.g., DCI configuration component 199). Although the following description may be focused on 5G NR, the concepts described herein may be applicable to other similar areas, such as LTE, LTE-A, CDMA, GSM, and other wireless technologies.

Figures 2A, 2B, 2C, 2D:
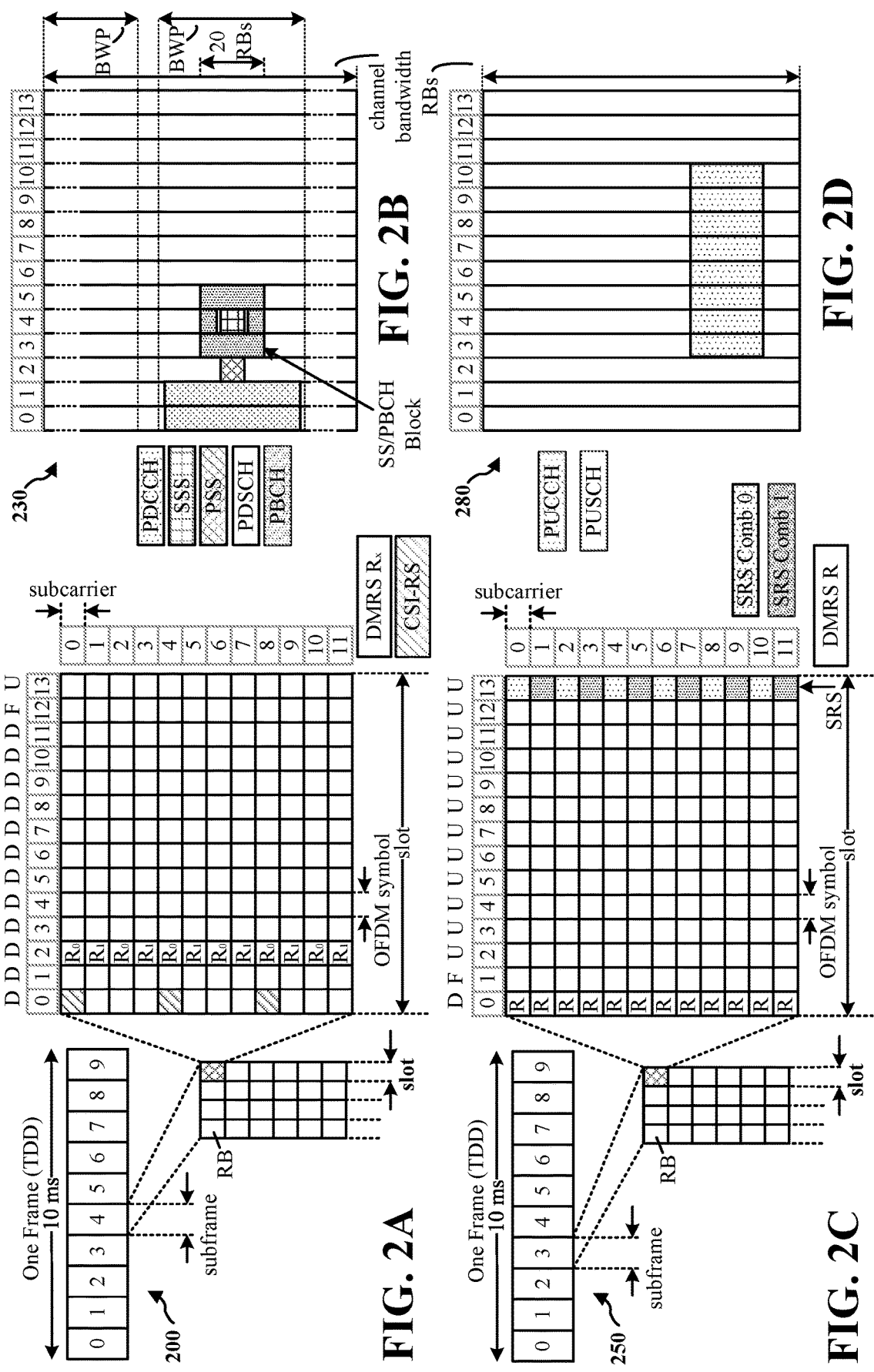
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative acknowledgement (NACK) feedback. The PUSCH carries data, and may additionally be used to carry a buffer status report (BSR), a power headroom report (PHR), and/or UCI.

Figure 3:
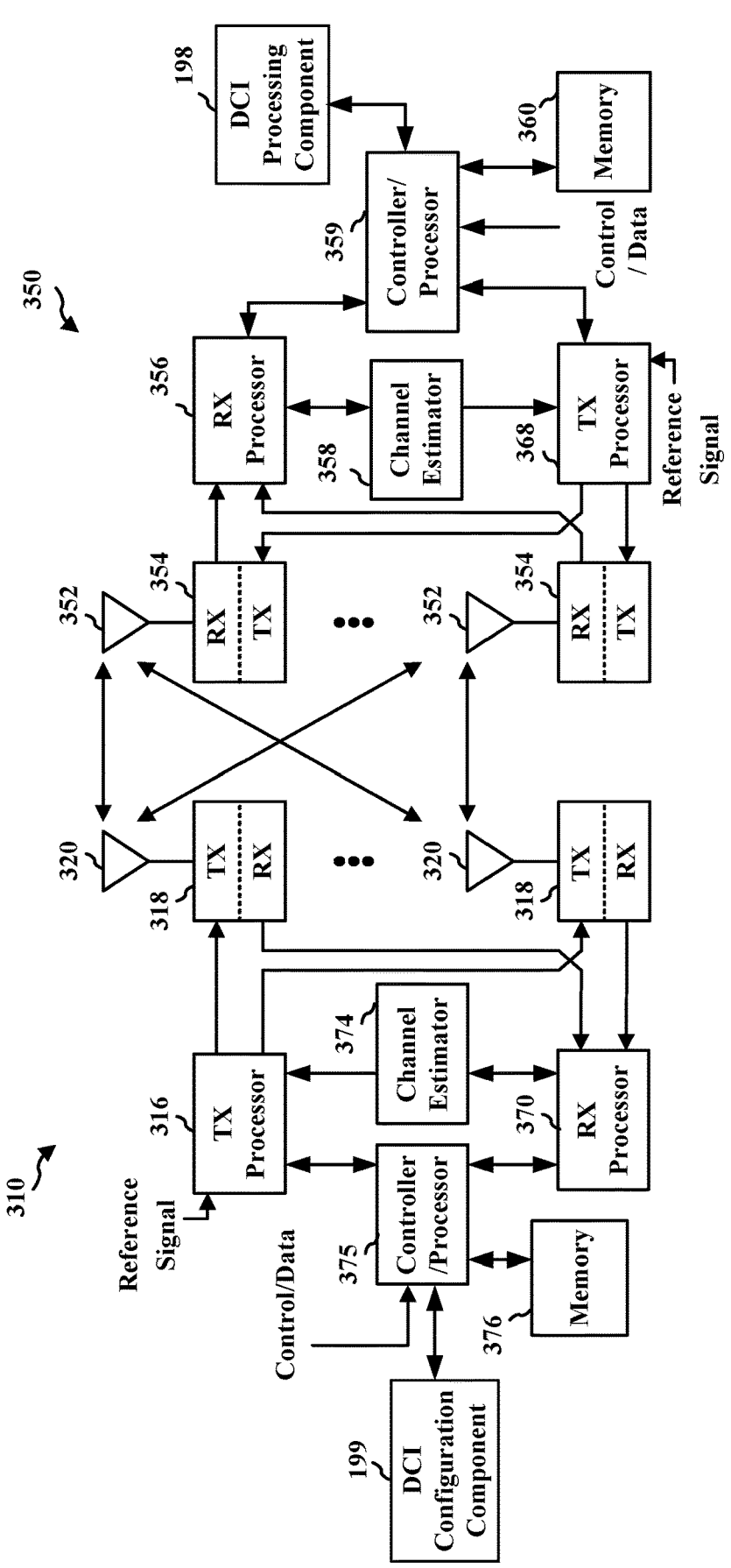
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects, a unified TCI framework may accommodate the case of separate beam indication for UL and DL by utilizing two separate TCI states, one for DL and one for UL. For separate DL TCI, the source reference signal(s) in M TCIs may provide quasi-colocation (QCL) information that is at least for UE-dedicated reception on PDSCH and for UE-dedicated reception on all or subset of CORESETs in a component carrier. For the separate UL TCI, the source reference signal(s) in N TCIs may provide a reference for determining common UL TX spatial filter(s) that is at least for dynamic-grant/configured-grant based PUSCH, all or a subset of dedicated PUCCH resources in a component carrier. In some aspects, the UL TX spatial filter can also apply to all sounding reference signal (SRS) resources in resource set(s) configured for antenna switching/codebook-based/non-codebook-based UL transmissions. As used herein, the term "TCI" can refer to at least a TCI state that includes at least one source RS to provide a reference (UE assumption) for determining QCL and/or spatial filter.

In some aspects, the types of beam indication may include a Type 1 that corresponds to joint DL/UL common TCI state to indicate a common beam for at least one DL channel/RS plus at least one UL channel/reference signal (RS). Another type is Type 2 that corresponds to separate DL common TCI state to indicate a common beam for more than one DL channel/RS. Another type is Type 3 that corresponds to separate UL common TCI state to indicate a common beam for more than one UL channel/RS. Another type is Type 4 that corresponds to separate DL single channel/RS TCI state to indicate a beam for a single DL channel/RS. Another type is Type 5 that corresponds to separate UL single channel/RS TCI state to indicate a beam for a single UL channel/RS. Still another type is Type 6 that corresponds to UL spatial relation info (e.g., SRS resource indicator (SRI)) to indicate a beam for a single UL channel/RS.

For beam indication with unified TCI, support may be provided by using a DCI format 1_1 or DCI format 1_2 without downlink assignment. In some aspects, a UE may use an ACK/NACK mechanism analogous to that for semi-persistent scheduling (SPS) PDSCH release with both type-1 and type-2 HARQ-ACK codebook. For example, upon a successful reception of the beam indication DCI, the UE may report an ACK. In some aspects, upon a failed reception of the beam indication DCI, a NACK can be reported. In some aspects, for type-1 HARQ-ACK codebook, a location for the ACK information in the HARQ-ACK codebook is determined based on a virtual PDSCH indicated by a time domain resource assignment (TDRA) field in the beam indication DCI, based on the time domain allocation list configured for PDSCH. In other aspects, for type-2 HARQ-ACK codebook, a location for the ACK information in the HARQ-ACK codebook is determined according to the same rule for SPS release. The ACK may be reported in a PUCCH k slots after the end of the PDCCH reception, where k is indicated by the PDSCH-to-HARQ_feedback timing indicator field in the DCI format. In other aspects, it may be provided by dl-DataToUL-ACK. In still other aspects, it also may be provided by dl-DataToUL-ACK-ForDCI-Format1-2-r16 if the PDSCH-to-HARQ_feedback timing indicator field is not present in the DCI.

When the DCI is used for beam indication, a scrambling sequence (e.g., CS-RNTI) is used to scramble the CRC for the DCI. The values of the following DCI fields may be set as follows: (1) RV=all '1's; (2) MCS=all '1's; (3) NDI=0; and (4) set to all '0's for frequency domain resource assignment (FDRA) Type 0, or all '1's for FDRA Type 1, or all '0's for dynamicSwitch (e.g., same as in Table 10.2-4 of TS38.213).

In some aspects, the UE can use the existing TCI field (e.g., may always be present) to signal the following: 1) Joint DL/UL TCI state, 2) DL-only TCI state (for separate DL/UL TCI), 3) UL-only TCI state (for separate DL/UL TCI). In some aspects, both DL TCI and UL TCI states can be signaled in one instance of beam indication DCI. In some aspects, there may be a relation between joint and separate TCIs (e.g., DL and/or UL) switching, including M/N>1 if supported. In some aspects, additional DCI fields may be used for determining whether the DCI is intended for beam indication or not. For example, the DCI may include one or more fields: 1) identifier for DCI formats; 2) carrier indicator; 3) bandwidth part indicator; 4) TDRA; 5) downlink assignment index (if configured); 6) TPC command for scheduled PUCCH; 7) PUCCH resource indicator; 8) PDSCH-to-HARQ_feedback timing indicator (if present). In some aspects, any remaining unused DCI fields and codepoints are reserved.

In some aspects, the UE may report whether or not to support TCI update by DCI format 1_1/1_2. For a UE supporting TCI update by DCI format 1_1/1_2, the UE may support TCI update by using DCI 1_1/1_2 with DL assignment. In some aspects, the UE may support a TCI update by DCI format 1_1/1_2 without DL assignment. In some aspects, the UE may handle the TCI update when there is only UL data. In some aspects, the UE may receive a downlink indication with separate UL TCI in DCI format 1_1/1_2 with DL assignment. In some aspects, when more than one TCI codepoints are activated by media access control (MAC) control element (CE), the UE may apply the activated TCI state(s) for the lowest codepoint. In some aspects, the "lowest codepoint" function can be configured on or off. In some aspects, the UE may support interactions with the DCI based beam update with M or N>1. In other aspects, the UE may support interactions with the DCI based beam update with M/N>1.

Not all fields used for validation or information may be present in certain DCI formats. In DCI format 1_2. For example, the redundancy version (RV) field is not always present in the DCI. In some aspects, the RV field may be set to 0, 1 or 2 bits determined by higher layer parameter numberOfBitsForRV-DCI-1-2, where if 0 bit is configured, rvid to be applied is 0; 1 bit according to Table 7.3.1.2.3-1 of TS38.213; or 2 bits according to Table 7.3.1.1.1-2 of TS38.213. For example, the RV field set to all ones (e.g., '1') is used for validation, but in the DCI format 1_2, the RV field may have zero bit. When a zero bit is configured for the RV field, the UE may assume it is '0'. Similarly, the TDRA field may be needed to schedule a virtual PDSCH, and the virtual PDSCH can be used to determine ACK time. However, the TDRA field may not be present in the DCI format 1_2. When DCI format 1_2 is used, and the RV field is not present, UE cannot use RV field for validation. Then in this case, UE may not be able to tell whether the DCI is for SPS release or beam indication.

In this regard, the present disclosure provides for a DCI format design for indication of transmission configuration indication state. In some aspects, when a required field for validation/information conveying purpose is not present, multiple design options may be available to the UE. For example, the UE may not use such field that may be absent in a certain DCI format for validation/information field. The UE may instead use the MCS with all zeroes as the validation field to distinguish from SPS release DCI. In another example, the UE may not expect to receive such DCI format to indicate TCI without DL assignment, if a required field is not configured for the DCI format. In some aspects, some predefined bits are assumed when the field is not present. In other aspects, the UE may use another field as alternative only when the original required field is not present in the DCI. For example, when the TDRA is not present, the RV field is present, the DCI has format 1_2, and the CS-RNTI check passed, then the UE may not expect to receive such DCI format to indicate TCI without DL assignment, if a required field is not configured for the DCI format 1_2. In other aspects, if the TDRA field is not present, then the UE may assume predefined bits when the TDRA field is not present. For example, if the validation check passed, the UE can determine the DCI is for beam indication, apply the TCI in the TCI field, and use a predefined value for TDRA (e.g., TDRA=1) and decide on which resource to transmit the ACK in response to the DCI.

In some aspects, the UE may use the existing TCI field to signal the following: 1) Joint DL/UL TCI state, 2) DL-only TCI state (for separate DL/UL TCI), or 3) UL-only TCI state (for separate DL/UL TCI). The UE may signal more than one TCI state for both DL and UL, which may reduce latency. However, this approach may make the DCI format and blind decoding more complicated. In some aspects, the UE may perform the signal indication of the multiple TCI states based on whether joint/separate DL and UL TCI states are activated and whether they are defined in a single pool. For example, the UE can be activated with either joint DL/UL TCI or separate DL/UL TCI via MAC CE signaling. In some aspects, joint DL/UL TCI state and separate DL/UL TCI are configured in different pools. In some aspects, the DCI or a preconfiguration via RRC signaling can define whether there is a link between a UL and DL TCI. In some aspects, different rules may be defined when DCI is with DL assignment or without DL assignment. In the case where the DCI excludes DL assignment, the DCI may include more reserved fields for use by the UE.

In the case of configured TCI IDs in the same pool for all TCI types, the UE may only be allowed to activate one TCI state included in the DCI based on activated TCI codepoint for one configured TCI ID. In other aspects, the UE may be allowed to activate multiple TCIs in the DCI based on one activated TCI codepoint that is mapped to multiple TCI IDs. In some aspects, this mapping between multiple TCI IDs and the TCI codepoint may be defined in a pre-configuration, e.g., via RRC signaling. In some examples, a codepoint is defined for one separate DL TCI ID and one separate UL TCI ID.

In other aspects, the TCI field is split into multiple codepoint subfields for joint, separate DL, and/or separate UL TCI codepoint. The network may define a reserved index when a certain type of TCI is not indicated in the DCI. For example, the base station may use additional bits in DCI to indicate how many TCI states are indicated in the DCI. For example, the DCI may include two subfields to indicate one DL TCI state and one UL TCI state. However, when the DCI may only indicate a single DL TCI, then the UL TCI state may be using a reserved index. In other examples, the DCI may include another bit to indicate only one TCI state is indicated in the DCI.

In other aspects, different types of TCI states are defined in multiple pools. For example, the TCI state ID may be indexed within each pool of the multiple pools. For example, a separate DL TCI and a separate UL TCI may use a common pool, whereas a joint TCI uses another pool within the multiple pools. In another example, each TCI state type has its own pool. In some aspects, the network may be allowed to indicate only one TCI state in one DCI transmission. For example, the TCI field may include a TCI index and a TCI type subfield (or a pool identifier in other aspects). In other aspects, the network may be allowed to indicate more than one TCI state in one DCI transmission. For example, the TCI field may be divided into multiple codepoint subfields for joint, separate DL, and/or separate UL TCI codepoint. The codepoint index is counted within each activated TCI type. In some aspects, a reserved index and/or additional bits may be used when a type of TCI state is not indicated in the DCI.

In some aspects, each of the aforementioned aspects may be specified for DL DCI with DL assignment or without DL assignment. For example, the network may be allowed to indicate more than one TCI state in the DCI for a DCI without DL assignment. In this regard, the UE may use the reserved field to indicate the information for the additional TCI states. In other aspects, the UE may be allowed to indicate a single TCI state in the DCI for DCI with DL assignment.

In some aspects, the network may use the UE capability to determine whether to allow multiple TCI states in a single DCI, and which combinations of TCI types are allowed to be indicated in the DCI. For example, the UE capability may indicate that only one of the following is allowed at a time (or in one configuration): 1){separate DL+UL}; or 2) {DL/ UL joint}. In some aspects, the base station may configure to turn on/off the TCI indication feature based on the UE capability. In other aspects, the UE capability can be reported to the base station separately for DCI with DL assignment and without DL assignment. Similarly, the downlink configuration based on the UE capability can be indicated separately for DCI with DL assignment and without DL assignment.

Figure 4:
FIG. 4 is a diagram illustrating an example of a DCI structure for different DCI purposes.

FIG. 4 is a diagram 400 illustrating an example of a DCI structure for different DCI purposes. The DCI structure includes a DCI format field, RNTI field, one-shot HARQ request field, TDRA field, MCS field, NDI field, RV field, HARQ field, antenna port field and DMRS sequence initialization field. The values of the DCI structure may vary based on the DCI purpose (e.g., PDSCH semi-persistent (SPS) Type 2 scheduling grant/PUSCH SPS Type 2 scheduling grant, SPS/UL Type 2 release, SPS/UL Type 2 activation, Type 3 HARQ request, SCell dormancy indication). For example, each of the "SPS/UL Type 2 release" and "SPS/UL Type 2 activation" purposes may apply to multiple DCI formats, such as DCI format 1_1 and 1_2, among others. For DCI format 1_2, the RV field may be configured to have zero bits (e.g., no bit allocation), which denotes that the RV field may not be present in the DCI. Similarly, for DCI format 1_2, the TDRA field may be configured to have zero bits (e.g., no bit allocation), which denotes that the TDRA field may not be present in the DCI. Other purposes, such as "Type 3 HARQ request" and "SCell dormancy," may apply to only DCI format 1_1.

FIG. 5 is a flowchart of a process 500 of wireless communication of a UE that facilitates a downlink control information format for indication of transmission configuration indication state. The process 500 may be performed by a UE (e.g., the UE 104; UE 350), which may include the memory 360 and which may be the entire UE or a component of the UE, such as the TX processor 368, the RX processor 356, and/or the controller/processor 359. As illustrated, the process 500 includes a number of enumerated steps, but implementations of the process 500 may include additional steps before, after, and in between the enumerated steps. In some implementations, one or more of the enumerated steps may be omitted or performed in a different order.

At 502, the UE may receive, from a base station, downlink control information (DCI). In some aspects, the DCI excludes downlink scheduling information for the UE.

At 504, the UE may determine whether the DCI is used for beam indication with or without downlink assignment. In some aspects, the UE may determine a format of the DCI. For example, the UE may determine that the DCI corresponds to a DCI format 1_1. In another example, the UE may determine that the DCI corresponds to a DCI format 1_2. In some aspects, the UE determines a scrambling sequence in the DCI. For example, the UE may determine whether the scrambling sequence in the DCI corresponds to a predetermined scrambling sequence. In some aspects, the predetermined scrambling sequence is a configured scheduling radio network temporary identifier (CS-RNTI). In some aspects, the UE determines whether each of a plurality of fields designated for validation is present in the DCI based on the format of the DCI.

In some aspects, the UE determines that the DCI is used for beam indication without downlink assignment based on the format of the DCI and the scrambling sequence in the DCI when each of the plurality of fields designated for validation is present in the DCI. For example, the UE may determine that one or more bit locations in the RV field is set to one when the RV field is configured to have at least one bit allocation in the DCI. In an alternative aspect, the UE may determine that the DCI is used for beam indication based on the format of the DCI, the scrambling sequence in the DCI and the MCS field within the plurality of fields of the DCI, when at least one of the plurality of fields designated for validation (e.g., RV field) is not present in the DCI. In some examples, the UE also may determine that one or more bit locations in the MCS field within the plurality of fields of the DCI is set to a value of one (e.g., '1'). The UE also may determine that a new data indicator (NDI) field within the plurality of fields of the DCI is set to a value of zero (e.g., '0').

In some aspects, the UE may determine whether a time domain resource assignment (TDRA) field is present in the DCI based on the format of the DCI. In some aspects, the UE may apply a predetermined value for TDRA when the TDRA field is not present in the DCI. The UE also may determine one or more resources to transmit an acknowledgment to the DCI based on the predetermined value for the TDRA.

In other aspects, the UE may determine that the DCI is used for beam indication based on the format of the DCI, the scrambling sequence in the DCI and an alternative field of the DCI, when at least one of the plurality of fields designated for validation is not present in the DCI.

In other aspects, the UE determines that the DCI is used for another purpose and not for the beam indication when at least one of the plurality of fields designated for validation is not present in the DCI. For example, the UE may determine that the DCI is used for another purpose (e.g., SPS/UL Type 2 release, SPS/UL Type 2 activation, Type 3 HARQ request, SCell dormancy) and not beam indication without downlink assignment, when at least one of the plurality of fields designated for validation is not present in the DCI.

At 506, the UE may apply one or more transmission configuration indication (TCI) states based on one or more TCI codepoints in a TCI field of the DCI, when the DCI is determined to be used for beam indication. In some aspects, the UE may determine that one or more TCI identifiers in the TCI field are configured for one or more TCI state types defined in a same pool. In some aspects, the one or more TCI state types includes a joint downlink/uplink TCI state, a downlink-only TCI state for separate downlink/uplink TCIs, and an uplink-only TCI state for the separate downlink/ uplink TCIs. In some aspects, the UE may determine to activate one TCI state in the DCI based on a TCI codepoint in the TCI field of the DCI, in which the TCI codepoint is mapped to one of the one or more TCI identifiers. In other aspects, the UE may determine to activate a plurality of TCI states in the DCI based on a TCI codepoint in the TCI field of the DCI, in which the TCI codepoint is mapped to a plurality of TCI identifiers based on a preconfiguration. For example, the TCI codepoint may be defined for one separate downlink TCI identifier and one separate uplink TCI identifier.

In some aspects, the TCI field is divided into a plurality of TCI codepoint subfields that correspond to different TCI state types. In some aspects, the UE may determine a TCI state of a particular TCI state type at a reserved index within the plurality of TCI codepoint subfields, in which the TCI state of the particular TCI state type is not indicated in the DCI. In some aspects, the DCI includes one or more additional bits to indicate a number of TCI states indicated in the DCI.

In some aspects, the UE may determine that the DCI is used for beam indication with downlink assignment, in which the DCI is allowed to include a single TCI state in the TCI field of the DCI. In other aspects, the UE may determine that the DCI is used for beam indication without downlink assignment, in which the DCI is allowed to include additional TCI states beyond one TCI state and includes a reserved field to indicate information for the additional TCI states.

In some aspects, the UE may determine that one or more TCI identifiers in the TCI field are configured for different TCI state types defined in a plurality of pools. For example, separate downlink/uplink TCI states are defined in a first pool of the plurality of pools and joint downlink/uplink TCI states are defined in a second pool of the plurality of pools. In some aspects, a TCI state is indexed in each of the plurality of pools by a corresponding TCI identifier. In some aspects, the one or more TCI identifiers of a common TCI state type are indexed in a common pool of the plurality of pools. In some aspects, each of the different TCI state types is indexed in a separate pool of the plurality of pools. In some aspects, the UE may determine to activate one TCI state in the DCI based on one or more of a TCI index, a TCI state type subfield in the TCI field or a pool identifier. In some aspects, the UE may determine to activate a plurality of TCI states in the DCI based on a TCI codepoint in the TCI field of the DCI, in which the TCI codepoint is mapped to a plurality of TCI identifiers. In some aspects, the TCI field is divided into a plurality of TCI codepoint subfields that correspond to the different TCI state types. In some aspects, the UE may determine a TCI state of a particular TCI type at a reserved index within the plurality of TCI codepoint subfields, in which the TCI state of the particular TCI type is not indicated in the DCI.

In some aspects, the DCI includes one or more additional bits to indicate a number of TCI states indicated in the DCI. In other aspects, the UE may determine that the DCI is used for beam indication with downlink assignment, wherein the DCI is allowed to include a single TCI state. In some aspects, the UE may determine that the DCI is used for beam indication without downlink assignment, wherein the DCI is allowed to include additional TCI states beyond one TCI state and includes a reserved field to indicate information for the additional TCI states. In some aspects, the UE may receive, from the base station, downlink signaling indicating whether the base station intends to indicate more than one TCI state in the DCI, in which the downlink signaling is received at a time prior to the receiving of the DCI.

In some aspects, capability information of the UE indicates whether to allow a plurality of TCI states to be included in a single DCI transmission. For example, capability information of the UE indicates which combinations of the plurality of TCI states to allow to be included in the DCI.

After UE the receives the DCI indicating a TCI state, the UE may apply the indicated TCI state after a time period (also referred to as "application time") after either (i) the UE receives the DCI, or (ii) the UE sends an ACK in response to the DCI.

The UE may determine the length of the application time based on a fixed rule in a network specification (e.g., 3GPP standard) or based on network signaling (e.g., gNB signaling). In some aspects, where the DCI can update the TCI state in multiple component carriers (CCs), such as in the case of a common TCI update across CCs, the application time for applying the TCI state can be determined with the following options. In Option 1, the application time is based on a per-CC basis (or referred to as "per-CC based application time"), and the application time per CC may be computed based on the tone spacing of the DCI, the CC used to send the ACK, and the CC used to apply the TCI state. In Option 2, the application time is a common timing applied across all CCs (e.g. aligned to the largest application time based on per-CC computation or used with the largest tone spacing in CCs to apply the TCI state to compute the time duration). In Option 3, the application time is dynamically indicated via the DCI and/or MAC-CE (e.g. activation MAC-CE), or semi-statically via RRC signaling.

FIG. 6 is a flowchart of a process 600 of wireless communication of a base station that configures a downlink control information format for indication of transmission configuration indication state. The process 600 may be performed by a cell (e.g., serving cell, non-serving cell) or a base station, which may include the memory 376 and which may be the entire base station or a component of the base station, such as the TX processor 316, the RX processor 370, and/or the controller/processor 375. As illustrated, the process 600 includes a number of enumerated steps, but implementations of the process 600 may include additional steps before, after, and in between the enumerated steps. In some implementations, one or more of the enumerated steps may be omitted or performed in a different order.

At 602, the base station may generate downlink control information (DCI) with information indicating whether the DCI is intended for beam indication with or without downlink assignment. In some aspects, the DCI includes one or more TCI codepoints in a TCI field of the DCI to apply one or more transmission configuration indication (TCI) states at the UE when the information in the DCI indicates that the DCI is intended for beam indication. In some aspects, the base station may generate the DCI with the information indicating that the DCI is intended for beam indication without downlink assignment, wherein the information comprises a field indicating a format of the DCI, a scrambling sequence in the DCI and a plurality of fields indicating whether the DCI is designated for validation. In some aspects, the base station may scramble the DCI with the scrambling sequence that corresponds to a configured scheduling radio network temporary identifier (CS-RNTI). In some aspects, the base station may generate the DCI with a time domain resource assignment (TDRA) field based on the format of the DCI.

In some aspects, the base station may transmit, to the UE, a configuration indicating a predetermined value for a time domain resource assignment (TDRA) that is intended to be used at the UE when a TDRA field is not present in the DCI. In other aspects, the base station transmits, to the UE, downlink signaling indicating whether the BS intends to indicate more than one TCI state in the DCI, wherein the downlink signaling is transmitted at a time prior to the transmitting of the DCI.

In some aspects, the base station may receive, from the UE, capability information of the UE that indicates whether to allow a plurality of TCI states to be included in a single DCI transmission. For example, the capability information of the UE indicates which combinations of the plurality of TCI states to allow to be included in the DCI.

At 604, the base station may transmit, to a user equipment (UE), the DCI.

Figure 7:
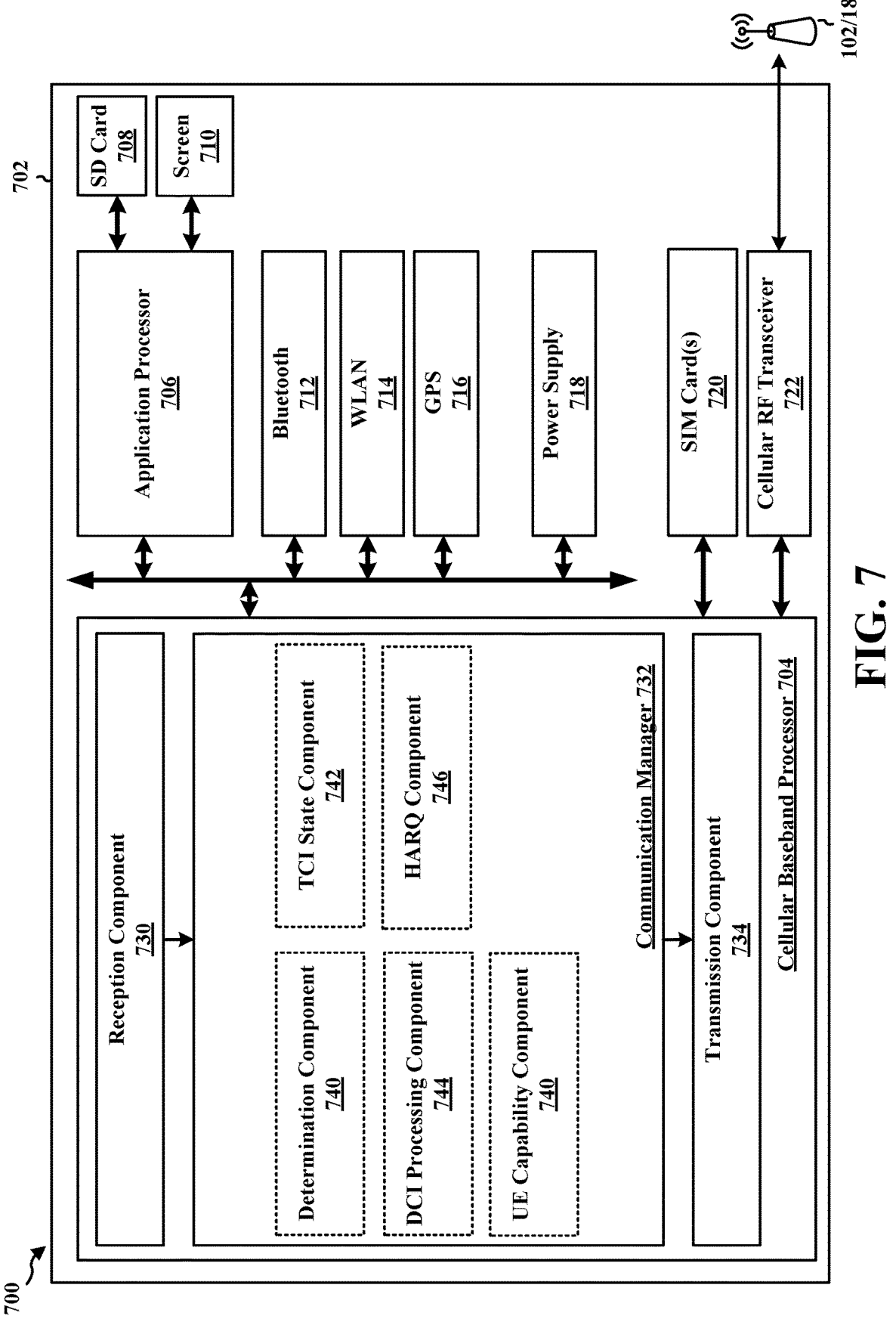
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 74 and/or BS 72/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software.

The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforementioned additional modules of the apparatus 702.

The communication manager 732 includes a determination component 740 that determines whether the DCI is used for beam indication with or without downlink assignment, e.g., as described in reference to 504 of FIG. 5. The communication manager 732 further includes a TCI state component 742 that may apply one or more transmission configuration indication (TCI) states based on one or more TCI codepoints in a TCI field of the DCI, when the DCI is determined to be used for beam indication, e.g., as described in reference to 506 of FIG. 5. The communication manager 732 further includes a DCI processing component 744 that receives, from a base station, downlink control information (DCI), via the reception component 730. The communication manager 732 further includes a HARQ component 746 that may apply a predetermined value for TDRA when the TDRA field is not present in the DCI, and determine one or more resources to transmit an acknowledgment to the DCI based on the predetermined value for the TDRA. The communication manager 732 further includes a UE capability component 748 that transmits capability information of the UE to the base station. In some aspects, the capability information of the UE indicates whether to allow a plurality of TCI states to be included in a single DCI transmission. In other aspects, the capability information of the UE indicates which combinations of the plurality of TCI states to allow to be included in the DCI.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving, from a base station, downlink control information (DCI), determining whether the DCI is used for beam indication with or without downlink assignment, and applying one or more transmission configuration indication (TCI) states based on one or more TCI codepoints in a TCI field of the DCI, when the DCI is determined to be used for beam indication. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
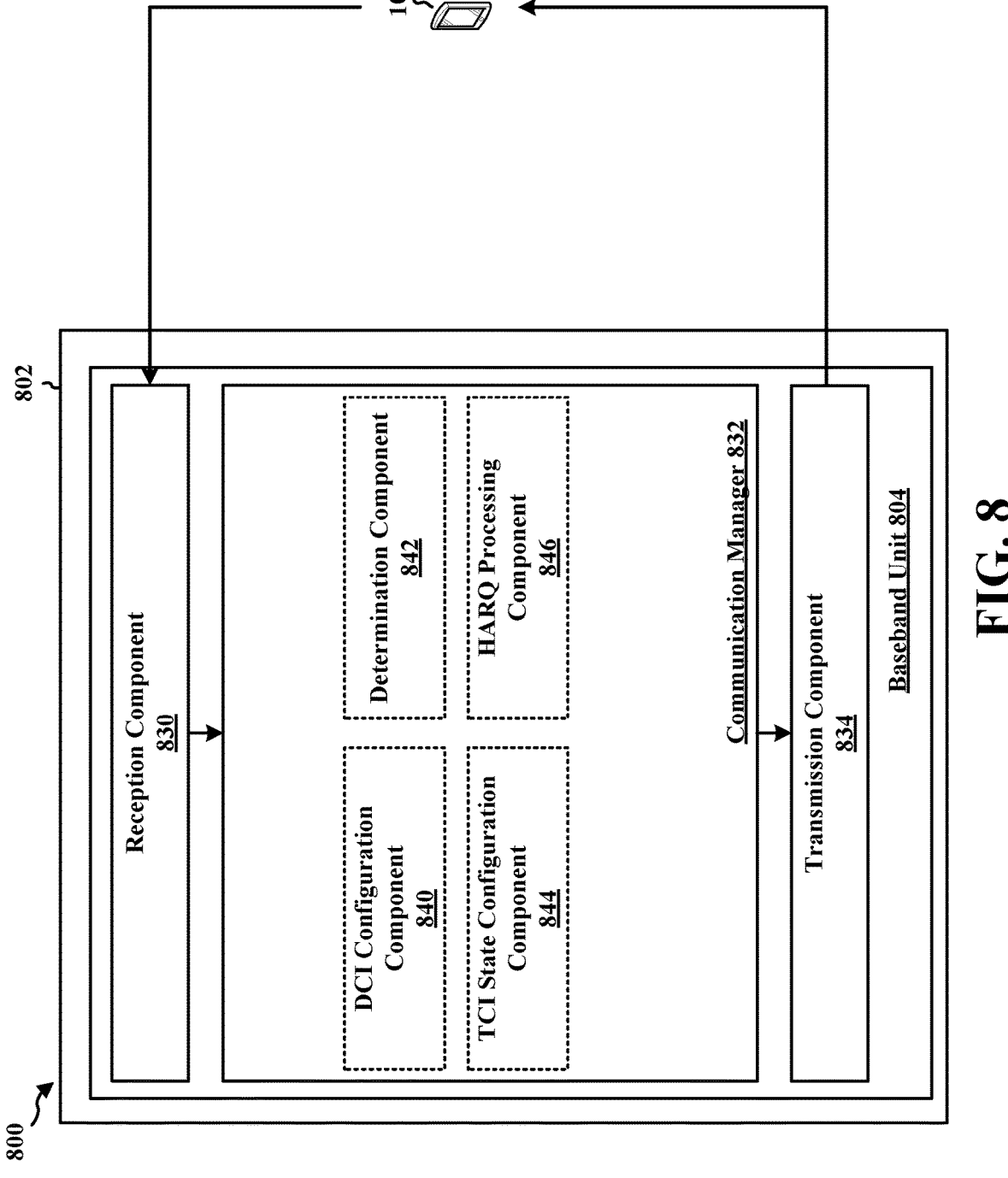
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a DCI configuration component 840 that generates downlink control information (DCI) with information indicating whether the DCI is intended for beam indication with or without downlink assignment, e.g., as described in reference to 602 of FIG. 6. In some aspects, the DCI configuration component 840 can generate the DCI that excludes the TDRA field based on the format of the DCI, and transmit, to the UE via the transmission component 834, the DCI excluding the TDRA field. The communication manager 832 further includes a determination component 842 that may determine whether the DCI is intended for beam indication. In some aspects, The communication manager 832 further includes a TCI state configuration component 844 that configures one or more TCI codepoints in a TCI field of the DCI to apply one or more transmission configuration indication (TCI) states at the UE when the information in the DCI indicates that the DCI is intended for beam indication. The communication manager 832 further includes a HARQ processing component 846 that receives, from the UE, an acknowledgment to the DCI based on the predetermined value for the TDRA.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for generating downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at the UE when the information in the DCI indicates that the DCI is intended for beam indication, and transmitting, to a user equipment (UE), the DCI. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other embodiments or teachings described herein, without limitation.

Aspect 1 is a method of wireless communication at a user equipment (UE), the method comprising: receiving, from a base station, downlink control information (DCI); determining whether the DCI is used for beam indication with or without downlink assignment; and applying one or more transmission configuration indication (TCI) states based on one or more TCI codepoints in a TCI field of the DCI, when the DCI is determined to be used for beam indication.

In Aspect 2, the method of Aspect 1 further includes determining a format of the DCI; determining a scrambling sequence in the DCI; determining whether each of a plurality of fields designated for validation is present in the DCI based on the format of the DCI; determining that the DCI is used for beam indication without downlink assignment based on the format of the DCI and the scrambling sequence in the DCI when each of the plurality of fields designated for validation is present in the DCI; and determining that the DCI is used for another purpose and not for the beam indication when at least one of the plurality of fields designated for validation is not present in the DCI.

In Aspect 3, the method of Aspect 1 or Aspect 2 further includes that the determining the scrambling sequence comprises determining whether the scrambling sequence in the DCI corresponds to a predetermined scrambling sequence.

In Aspect 4, the method of any of Aspects 1-3 further includes that the predetermined scrambling sequence is a configured scheduling radio network temporary identifier (CS-RNTI).

In Aspect 5, the method of any of Aspects 1-4 further includes that the determining comprises determining that the DCI is used for beam indication based on the format of the DCI, the scrambling sequence in the DCI and a modulation and coding scheme (MCS) field within the plurality of fields of the DCI, when the at least one of the plurality of fields designated for validation is not present in the DCI.

In Aspect 6, the method of any of Aspects 1-5 further includes that the determining comprises determining that the DCI is used for another purpose and not beam indication without downlink assignment, when at least one of the plurality of fields designated for validation is not present in the DCI.

In Aspect 7, the method of any of Aspects 1-6 further includes that the determining the format comprises determining that the DCI corresponds to a DCI format 1_1.

In Aspect 8, the method of any of Aspects 1-7 further includes that the determining the format comprises determining that the DCI corresponds to a DCI format 1_2.

In Aspect 9, the method of any of Aspects 1-8 further includes determining that one or more bit locations in the RV field is set to a value of one when the RV field is configured to have at least one bit allocation in the DCI; determining that one or more bit location values in a modulation and coding scheme (MCS) field within the plurality of fields of the DCI is set to a value of one; and determining that a new data indicator (NDI) field value within the plurality of fields of the DCI is set to a value of zero.

In Aspect 10, the method of any of Aspects 1-9 further includes determining whether a time domain resource assignment (TDRA) field is present in the DCI based on the format of the DCI.

In Aspect 11, the method of any of Aspects 1-10 further includes applying a predetermined value for TDRA when the TDRA field is not present in the DCI; and determining one or more resources to transmit an acknowledgment to the DCI based on the predetermined value for the TDRA.

In Aspect 12, the method of any of Aspects 1-11 further includes that the determining comprises determining that the DCI is used for beam indication based on the format of the DCI, the scrambling sequence in the DCI and an alternative field of the DCI, when at least one of the plurality of fields designated for validation is not present in the DCI.

In Aspect 13, the method of any of Aspects 1-12 further includes that the DCI excludes downlink scheduling information for the UE.

In Aspect 14, the method of any of Aspects 1-13 further includes determining that one or more TCI identifiers in the TCI field are configured for one or more TCI state types defined in a same pool.

In Aspect 15, the method of any of Aspects 1-14 further includes that the one or more TCI state types includes a joint downlink/uplink TCI state, a downlink-only TCI state for separate downlink/uplink TCIs, and an uplink-only TCI state for the separate downlink/uplink TCIs.

In Aspect 16, the method of any of Aspects 1-15 further includes determining to activate one TCI state in the DCI based on a TCI codepoint in the TCI field of the DCI, wherein the TCI codepoint is mapped to one of the one or more TCI identifiers.

In Aspect 17, the method of any of Aspects 1-16 further includes determining to activate a plurality of TCI states in the DCI based on a TCI codepoint in the TCI field of the DCI, wherein the TCI codepoint is mapped to a plurality of TCI identifiers based on a preconfiguration.

In Aspect 18, the method of any of Aspects 1-17 further includes that the TCI codepoint is defined for one separate downlink TCI identifier and one separate uplink TCI identifier.

In Aspect 19, the method of any of Aspects 1-18 further includes that the TCI field is divided into a plurality of TCI codepoint subfields that correspond to different TCI state types.

In Aspect 20, the method of any of Aspects 1-19, further comprising: determining a TCI state of a particular TCI state type at a reserved index within the plurality of TCI codepoint subfields, wherein the TCI state of the particular TCI state type is not indicated in the DCI.

In Aspect 21, the method of any of Aspects 1-20 further includes that the DCI includes one or more additional bits to indicate a number of TCI states indicated in the DCI.

In Aspect 22, the method of any of Aspects 1-21 further includes determining that the DCI is used for beam indication with downlink assignment, wherein the DCI is allowed to include a single TCI state.

In Aspect 23, the method of any of Aspects 1-22 further includes determining that the DCI is used for beam indication without downlink assignment, wherein the DCI is allowed to include additional TCI states beyond one TCI state and includes a reserved field to indicate information for the additional TCI states.

In Aspect 24, the method of any of Aspects 1-23 further includes determining that one or more TCI identifiers in the TCI field are configured for different TCI state types defined in a plurality of pools.

In Aspect 25, the method of any of Aspects 1-24 further includes that separate downlink/uplink TCI states are defined in a first pool of the plurality of pools and joint downlink/uplink TCI states are defined in a second pool of the plurality of pools.

In Aspect 26, the method of any of Aspects 1-24 further includes that a TCI state is indexed in each of the plurality of pools by a corresponding TCI identifier.

In Aspect 27, the method of any of Aspects 1-24 further includes that the one or more TCI identifiers of a common TCI state type are indexed in a common pool of the plurality of pools.

In Aspect 28, the method of any of Aspects 1-24 further includes that each of the different TCI state types is indexed in a separate pool of the plurality of pools.

In Aspect 29, the method of any of Aspects 1-24 further includes determining to activate one TCI state in the DCI based on one or more of a TCI index, a TCI state type subfield in the TCI field or a pool identifier.

In Aspect 30, the method of any of Aspects 1-24 further includes determining to activate a plurality of TCI states in the DCI based on a TCI codepoint in the TCI field of the DCI, wherein the TCI codepoint is mapped to a plurality of TCI identifiers.

In Aspect 31, the method of any of Aspects 1-30 further includes that the TCI field is divided into a plurality of TCI codepoint subfields that correspond to the different TCI state types.

In Aspect 32, the method of any of Aspects 1-31, further comprising: determining a TCI state of a particular TCI type at a reserved index within the plurality of TCI codepoint subfields, wherein the TCI state of the particular TCI type is not indicated in the DCI.

In Aspect 33, the method of any of Aspects 1-32 further includes that the DCI includes one or more additional bits to indicate a number of TCI states indicated in the DCI.

In Aspect 34, the method of any of Aspects 1-33 further includes determining that the DCI is used for beam indication with downlink assignment, wherein the DCI is allowed to include a single TCI state.

In Aspect 35, the method of any of Aspects 1-34 further includes determining that the DCI is used for beam indication without downlink assignment, wherein the DCI is allowed to include additional TCI states beyond one TCI state and includes a reserved field to indicate information for the additional TCI states.

In Aspect 36, the method of any of Aspects 1-35 further includes that capability information of the UE indicates whether to allow a plurality of TCI states to be included in a single DCI transmission.

In Aspect 37, the method of any of Aspects 1-36 further includes that capability information of the UE indicates which combinations of the plurality of TCI states to allow to be included in the DCI.

In Aspect 38, the method of any of Aspects 1-37 further includes receiving, from the base station, downlink signaling indicating whether the base station intends to indicate more than one TCI state in the DCI, wherein the downlink signaling is received at a time prior to the receiving of the DCI.

Aspect 39 is a method of wireless communication at a base station (BS), the method comprising: generating downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at the UE when the information in the DCI indicates that the DCI is intended for beam indication; and transmitting, to a user equipment (UE), the DCI.

In Aspect 40, the method of Aspect 39 further includes that the generating comprises generating the DCI with the information indicating that the DCI is intended for beam indication without downlink assignment, wherein the information comprises a field indicating a format of the DCI, a scrambling sequence in the DCI and a plurality of fields indicating whether the DCI is designated for validation.

In Aspect 41, the method of Aspect 39 or Aspect 40 further includes scrambling the DCI with the scrambling sequence that corresponds to a configured scheduling radio network temporary identifier (CS-RNTI).

In Aspect 42, the method of any of Aspects 39-41 further includes that the generating comprises generating the DCI with a time domain resource assignment (TDRA) field based on the format of the DCI.

In Aspect 43, the method of any of Aspects 39-42, further comprising: transmitting, to the UE, a configuration indicating a predetermined value for a time domain resource assignment (TDRA) that is intended to be used at the UE when a TDRA field is not present in the DCI.

In Aspect 44, the method of any of Aspects 39-43 further includes that the generating comprises generating the DCI that excludes the TDRA field based on the format of the DCI, further comprising: transmitting, to the UE, the DCI excluding the TDRA field; and receiving, from the UE, an acknowledgment to the DCI based on the predetermined value for the TDRA.

In Aspect 45, the method of any of Aspects 39-44 further includes that the generating comprises generating the DCI with one or more TCI identifiers in the TCI field of the DCI that are configured for one or more TCI state types defined in a same pool.

In Aspect 46, the method of any of Aspects 39-45 further includes that the one or more TCI state types includes a joint downlink/uplink TCI state, a downlink-only TCI state for separate downlink/uplink TCIs, and an uplink-only TCI state for the separate downlink/uplink TCIs.

In Aspect 47, the method of any of Aspects 39-45 further includes that the generating comprises generating the DCI with a TCI codepoint in the TCI field of the DCI for activating one TCI state at the UE, wherein the TCI codepoint is mapped to one of the one or more TCI identifiers.

In Aspect 48, the method of any of Aspects 39-45 further includes that the generating comprises generating the DCI with a TCI codepoint in the TCI field of the DCI for activating a plurality of DCIs at the UE, further comprising: transmitting, to the UE, a configuration indicating that the TCI codepoint is mapped to a plurality of TCI identifiers, wherein the configuration is transmitted as a preconfiguration to the UE at a time prior to transmission of the DCI.

In Aspect 49, the method of any of Aspects 39-48 further includes that the TCI codepoint is defined for one separate downlink TCI identifier and one separate uplink TCI identifier.

In Aspect 50, the method of any of Aspects 39-49 further includes that the generating comprises generating the DCI with the TCI field divided into a plurality of TCI codepoint subfields that correspond to different TCI state types.

In Aspect 51, the method of any of Aspects 39-50 further includes that the generating comprises generating the DCI with a reserved index within the plurality of TCI codepoint subfields to allow the UE to determine a TCI state of a particular TCI state type, wherein the TCI state of the particular TCI state type is not indicated in the DCI.

In Aspect 52, the method of any of Aspects 39-51 further includes that the generating comprises generating the DCI with one or more additional bits to indicate a number of TCI states indicated in the DCI.

In Aspect 53, the method of any of Aspects 39-52 further includes that the generating comprises generating the DCI with one or more TCI identifiers in the TCI field of the DCI that are configured for different TCI state types defined in a plurality of pools, wherein separate downlink/uplink TCI states are defined in a first pool of the plurality of pools and joint downlink/uplink TCI states are defined in a second pool of the plurality of pools.

In Aspect 54, the method of any of Aspects 39-53 further includes that the generating comprises generating the DCI with one or more of a TCI index, a TCI state type subfield in the TCI field or a pool identifier to allow activation of one TCI state in the DCI at the UE.

In Aspect 55, the method of any of Aspects 39-53 further includes that the generating comprises generating the DCI with a TCI codepoint in the TCI field of the DCI that is mapped to a plurality of TCI identifiers to allow activation of a plurality of DCIs in the DCI at the UE.

In Aspect 56, the method of any of Aspects 39-55 further includes that the generating comprises generating the DCI with the TCI field divided into a plurality of TCI codepoint subfields that correspond to the different TCI state types.

In Aspect 57, the method of any of Aspects 39-56 further includes that the generating comprises generating the DCI with a reserved index within the plurality of TCI codepoint subfields to allow the UE to determine a TCI state of a particular TCI state type, wherein the TCI state of the particular TCI state type is not indicated in the DCI.

In Aspect 58, the method of any of Aspects 39-57 further includes that the generating comprises generating the DCI with one or more additional bits to indicate a number of TCI states indicated in the DCI.

In Aspect 59, the method of any of Aspects 39-58 further includes receiving, from the UE, capability information of the UE that indicates whether to allow a plurality of TCI states to be included in a single DCI transmission.

In Aspect 60, the method of any of Aspects 39-59 further includes that capability information of the UE indicates which combinations of the plurality of TCI states to allow to be included in the DCI.

In Aspect 61, the method of any of Aspects 39-60 further includes transmitting, to the UE, downlink signaling indicating whether the BS intends to indicate more than one TCI state in the DCI, wherein the downlink signaling is transmitted at a time prior to the transmitting of the DCI.

Aspect 62 is a device including one or more processors and one or more memories in electronic communication with the one or more processors storing instructions executable by the one or more processors to cause a system or an apparatus to implement a method as in any of Aspects 1 to 38.

Aspect 63 is a system or apparatus including means for implementing a method or realizing an apparatus as in any of Aspects 1 to 38.

Aspect 64 is a non-transitory computer-readable medium storing instructions executable by one or more processors to cause the one or more processors to implement a method as in any of Aspects 1 to 38.

Aspect 65 is a device including one or more processors and one or more memories in electronic communication with the one or more processors storing instructions executable by the one or more processors to cause a system or an apparatus to implement a method as in any of Aspects 39 to 61.

Aspect 66 is a system or apparatus including means for implementing a method or realizing an apparatus as in any of Aspects 39 to 61.

Aspect 67 is a non-transitory computer-readable medium storing instructions executable by one or more processors to cause the one or more processors to implement a method as in any of Aspects 39 to 61.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:

receiving, from a base station, downlink control information (DCI);

determining whether the DCI is used for beam indication with or without downlink assignment, wherein determining whether the DCI is used for beam indication with or without downlink assignment comprises determining that the DCI is used for beam indication without downlink assignment based on a format of the DCI and a scrambling sequence in the DCI when each of a plurality of fields designated for validation are present in the DCI; and applying one or more transmission configuration indication (TCI) states based on one or more TCI codepoints in a TCI field of the DCI, when the DCI is determined to be used for beam indication.

2. The method of claim 1, further comprising:

determining the format of the DCI;

determining the scrambling sequence in the DCI;

determining whether each of the plurality of fields designated for validation is present in the DCI based on the format of the DCI;

and determining that the DCI is used for another purpose and not for the beam indication when at least one of the plurality of fields designated for validation is not present in the DCI.

3. The method of claim 2, wherein the determining the scrambling sequence comprises determining whether the scrambling sequence in the DCI corresponds to a predetermined scrambling sequence, wherein the predetermined scrambling sequence is a configured scheduling radio network temporary identifier (CS-RNTI).

4. The method of claim 1, wherein determining whether the DCI is used for beam indication with or without downlink assignment comprises determining that the DCI is used for beam indication further based on a modulation and coding scheme (MCS) field within the plurality of fields of the DCI, when the at least one of the plurality of fields designated for validation is not present in the DCI.

5. The method of claim 1, further comprising:

determining that one or more bit locations of a redundancy version (RV) field in the plurality of fields is set to a value of one when the RV field is configured to have at least one bit allocation in the DCI;

determining that one or more bit locations in a modulation and coding scheme (MCS) field within the plurality of fields of the DCI is set to a value of one; and determining that a new data indicator (NDI) field within the plurality of fields of the DCI is set to a value of zero.

6. The method of claim 1, further comprising:

determining whether a time domain resource assignment (TDRA) field is present in the DCI based on the format of the DCI;

applying a predetermined value for TDRA when the TDRA field is not present in the DCI; and determining one or more resources to transmit an acknowledgment to the DCI based on the predetermined value for the TDRA.

7. The method of claim 1, wherein the determining comprises determining that the DCI is used for beam indication based on the format of the DCI, the scrambling sequence in the DCI and an alternative field of the DCI, when at least one of the plurality of fields designated for validation is not present in the DCI.

8. The method of claim 1, wherein the DCI excludes downlink scheduling information for the UE.

9. The method of claim 1, further comprising determining that one or more TCI identifiers in the TCI field are configured for one or more TCI state types defined in a same pool.

10. The method of claim 9, wherein the one or more TCI state types includes a joint downlink/uplink TCI state, a downlink-only TCI state for separate downlink/uplink TCIs, and an uplink-only TCI state for the separate downlink/uplink TCIs.

11. The method of claim 9, further comprising determining to activate one TCI state in the DCI based on a TCI codepoint in the TCI field of the DCI, wherein the TCI codepoint is mapped to one of the one or more TCI identifiers.

12. The method of claim 9, further comprising determining to activate a plurality of TCI states in the DCI based on a TCI codepoint in the TCI field of the DCI, wherein the TCI codepoint is mapped to a plurality of TCI identifiers based on a preconfiguration, wherein the TCI codepoint is defined for one separate downlink TCI identifier and one separate uplink TCI identifier.

13. The method of claim 9, wherein the TCI field is divided into a plurality of TCI codepoint subfields that correspond to different TCI state types, further comprising:

determining a TCI state of a particular TCI state type at a reserved index within the plurality of TCI codepoint subfields, wherein the TCI state of the particular TCI state type is not indicated in the DCI, wherein the DCI includes one or more additional bits to indicate a number of TCI states indicated in the DCI.

14. The method of claim 9, wherein the DCI is allowed to include additional TCI states beyond one TCI state and includes a reserved field to indicate information for the additional TCI states.

15. The method of claim 1, further comprising determining that one or more TCI identifiers in the TCI field are configured for different TCI state types defined in a plurality of pools.

16. The method of claim 15, wherein separate downlink/uplink TCI states are defined in a first pool of the plurality of pools and joint downlink/uplink TCI states are defined in a second pool of the plurality of pools.

17. The method of claim 15, wherein a TCI state is indexed in each of the plurality of pools by a corresponding TCI identifier.

18. The method of claim 15, wherein the one or more TCI identifiers of a common TCI state type are indexed in a common pool of the plurality of pools.

19. The method of claim 15, wherein each of the different TCI state types is indexed in a separate pool of the plurality of pools.

20. The method of claim 15, further comprising determining to activate one TCI state in the DCI based on one or more of a TCI index, a TCI state type subfield in the TCI field or a pool identifier.

21. The method of claim 15, further comprising:

determining to activate a plurality of TCI states in the DCI based on a TCI codepoint in the TCI field of the DCI, wherein the TCI codepoint is mapped to a plurality of TCI identifiers, wherein the TCI field is divided into a plurality of TCI codepoint subfields that correspond to the different TCI state types; and determining a TCI state of a particular TCI type at a reserved index within the plurality of TCI codepoint subfields, wherein the TCI state of the particular TCI type is not indicated in the DCI.

22. The method of claim 15, wherein the DCI includes one or more additional bits to indicate a number of TCI states indicated in the DCI.

23. The method of claim 15, further comprising determining that the DCI is used for beam indication without downlink assignment, wherein the DCI is allowed to include additional TCI states beyond one TCI state and includes a reserved field to indicate information for the additional TCI states.

24. The method of claim 1, wherein capability information of the UE indicates whether to allow a plurality of TCI states to be included in a single DCI transmission, wherein the capability information of the UE indicates which combinations of the plurality of TCI states to allow to be included in the DCI.

25. The method of claim 1, further comprising receiving, from the base station, downlink signaling indicating whether the base station intends to indicate more than one TCI state in the DCI, wherein the downlink signaling is received at a time prior to the receiving of the DCI.

26. An apparatus for wireless communication, the apparatus comprising:

a transceiver;

one or more memories, individually or in combination, having instructions; and one or more processors, individually or in combination, configured to execute the instructions and cause the apparatus to:

receive, from a base station via the transceiver, downlink control information (DCI);

determine whether the DCI is used for beam indication with or without downlink assignment, wherein determining whether the DCI is used for beam indication with or without downlink assignment comprises determining that the DCI is used for beam indication without downlink assignment based on a format of the DCI and a scrambling sequence in the DCI when each of a plurality of fields designated for validation are present in the DCI; and apply one or more transmission configuration indication (TCI) states based on one or more TCI codepoints in a TCI field of the DCI, when the DCI is determined to be used for beam indication.

27. A method of wireless communication at a base station (BS), the method comprising:

generating downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at a user equipment (UE) when the information in the DCI indicates that the DCI is intended for beam indication, wherein the generating comprises generating the DCI with the information indicating that the DCI is intended for beam indication without downlink assignment, wherein the information comprises a field indicating a format of the DCI, a scrambling sequence in the DCI and a plurality of fields indicating whether the DCI is designated for validation; and transmitting, to the UE, the DCI.

28. The method of claim 27, further comprising scrambling the DCI with the scrambling sequence that corresponds to a configured scheduling radio network temporary identifier (CS-RNTI).

29. The method of claim 27, wherein the generating comprises generating the DCI with a time domain resource assignment (TDRA) field based on the format of the DCI.

30. The method of claim 27, further comprising: transmitting, to the UE, a configuration indicating a predetermined value for a time domain resource assignment (TDRA) that is intended to be used at the UE when a TDRA field is not present in the DCI, wherein the generating comprises generating the DCI that excludes the TDRA field based on the format of the DCI, further comprising:

transmitting, to the UE, the DCI excluding the TDRA field; and receiving, from the UE, an acknowledgment to the DCI based on the predetermined value for the TDRA.

31. The method of claim 27, wherein the generating comprises generating the DCI with one or more TCI identifiers in the TCI field of the DCI that are configured for one or more TCI state types defined in a same pool, wherein the one or more TCI state types includes a joint downlink/uplink TCI state, a downlink-only TCI state for separate downlink/uplink TCIs, and an uplink-only TCI state for the separate downlink/uplink TCIs.

32. The method of claim 31, wherein the generating comprises generating the DCI with a TCI codepoint in the TCI field of the DCI for activating one TCI state at the UE, wherein the TCI codepoint is mapped to one of the one or more TCI identifiers.

33. The method of claim 31, wherein the generating comprises generating the DCI with a TCI codepoint in the TCI field of the DCI for activating a plurality of DCIs at the UE, further comprising: transmitting, to the UE, a configuration indicating that the TCI codepoint is mapped to a plurality of TCI identifiers, wherein the configuration is transmitted as a preconfiguration to the UE at a time prior to transmission of the DCI, wherein the TCI codepoint is defined for one separate downlink TCI identifier and one separate uplink TCI identifier.

34. The method of claim 31, wherein the generating comprises:

generating the DCI with the TCI field divided into a plurality of TCI codepoint subfields that correspond to different TCI state types;

generating the DCI with a reserved index within the plurality of TCI codepoint subfields to allow the UE to determine a TCI state of a particular TCI state type, wherein the TCI state of the particular TCI state type is not indicated in the DCI; and generating the DCI with one or more additional bits to indicate a number of TCI states indicated in the DCI.

35. The method of claim 27, wherein the generating comprises generating the DCI with one or more TCI identifiers in the TCI field of the DCI that are configured for different TCI state types defined in a plurality of pools, wherein separate downlink/uplink TCI states are defined in a first pool of the plurality of pools and joint downlink/uplink TCI states are defined in a second pool of the plurality of pools.

36. The method of claim 35, wherein the generating comprises generating the DCI with one or more of a TCI index, a TCI state type subfield in the TCI field or a pool identifier to allow activation of one TCI state in the DCI at the UE.

37. The method of claim 35, wherein the generating comprises:

generating the DCI with a TCI codepoint in the TCI field of the DCI that is mapped to a plurality of TCI identifiers to allow activation of a plurality of DCIs in the DCI at the UE;

generating the DCI with the TCI field divided into a plurality of TCI codepoint subfields that correspond to the different TCI state types;

generating the DCI with a reserved index within the plurality of TCI codepoint subfields to allow the UE to determine a TCI state of a particular TCI state type, wherein the TCI state of the particular TCI state type is not indicated in the DCI; and generating the DCI with one or more additional bits to indicate a number of TCI states indicated in the DCI.

38. The method of claim 27, further comprising receiving, from the UE, capability information of the UE that indicates whether to allow a plurality of TCI states to be included in a single DCI transmission, wherein capability information of the UE indicates which combinations of the plurality of TCI states to allow to be included in the DCI.

39. The method of claim 27, further comprising transmitting, to the UE, downlink signaling indicating whether the BS intends to indicate more than one TCI state in the DCI, wherein the downlink signaling is transmitted at a time prior to the transmitting of the DCI.

40. An apparatus for wireless communication, the apparatus comprising:

a transceiver;

one or more memories, individually or in combination, having instructions; and one or processors, individually or in combination, configured to execute the instructions and cause the apparatus to:

generate downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at a user equipment (UE) when the information in the DCI indicates that the DCI is intended for beam indication, wherein the generating comprises generating the DCI with the information indicating that the DCI is intended for beam indication without downlink assignment, wherein the information comprises a field indicating a format of the DCI, a scrambling sequence in the DCI and a plurality of fields indicating whether the DCI is designated for validation; and transmit, to the UE via the transceiver, the DCI.

41. The apparatus of claim 26, wherein the one or more processors are further configured to execute instructions to cause the apparatus to:

determine the format of the DCI;

determine the scrambling sequence in the DCI;

determine whether each of the plurality of fields designated for validation is present in the DCI based on the format of the DCI; and determining that the DCI is used for another purpose and not for the beam indication when at least one of the plurality of fields designated for validation is not present in the DCI.

* * * * *